United States Patent [19]

Takahashi

[11] Patent Number: 4,966,049

[45] Date of Patent: Oct. 30, 1990

[54] SHIFT CONTROL SYSTEM FOR AUTOMATIC TRANSMISSION

[75] Inventor: Hiroshi Takahashi, Zushi, Japan

[73] Assignee: Nissan Motor Co., Ltd., Yokohama, Japan

[21] Appl. No.: 338,165

[22] Filed: Apr. 14, 1989

[30] Foreign Application Priority Data

Apr. 20, 1988 [JP] Japan .................................. 63-95493

[51] Int. Cl.⁵ .......................... F02D 41/02; G06G 7/70
[52] U.S. Cl. ...................................... 74/866; 364/424.1
[58] Field of Search ................. 74/865, 866; 364/424.1

[56] References Cited

U.S. PATENT DOCUMENTS

| | | | |
|---|---|---|---|
| 3,885,472 | 5/1975 | Wakamatsu et al. | 74/866 |
| 4,551,802 | 11/1985 | Smyth | 74/866 X |
| 4,642,771 | 2/1987 | Asagi et al. | 364/424.1 |
| 4,692,866 | 9/1987 | Kosuge | 74/866 X |
| 4,829,435 | 5/1989 | Isono | 364/424.1 |
| 4,838,126 | 6/1989 | Wilfinger et al. | 364/424.1 X |

Primary Examiner—Leslie A. Braun
Assistant Examiner—Benjamin Levi
Attorney, Agent, or Firm—Foley & Lardner, Schwartz, Jeffery, Schwaab, Mack, Blumenthal & Evans

[57] ABSTRACT

A shift control system for an automatic transmission of a vehicle includes a steering angle sensor for sensing a steering amount and producing a steering amount signal, a brake sensor for sensing a depression of a brake pedal and producing a brake signal representing the frequency of brake applications, and a control unit for determining a degree of correlation between the steering amount signal and the brake signal, and modifying the shift pattern so as to adapt the shift schedule to driving conditions in narrow streets or the like when the degree of correlation is high.

5 Claims, 5 Drawing Sheets

SHIFT CONTROL SYSTEM FOR AUTOMATIC TRANSMISSION

BACKGROUND OF THE INVENTION

The present invention relates to a shift control system for an automatic transmission.

Japanese Patent Provisional Publications Nos. 59-200840 and 60-132159 show conventional shift control systems having a steering angle sensor. Each of these control systems is designed to improve the acceleration feeling at the later stage of cornering by effecting a downshift when the steering wheel is returning toward the neutral position, and the throttle opening degree is increasing.

However, these conventional control systems are unsatisfactory in that shifts between first and second speeds are too frequent and annoying in some situations. In a narrow street in a residential area, for example, shifts between first and second speeds occur so frequently that the drive feeling is made worse by shift shock.

SUMMARY OF THE INVENTION

It is an object of the present invention to provide a shift control system which can improve the drive feeling by preventing unwanted automatic $ shifts.

According to the present invention, a shift control system for an automatic transmission of a vehicle comprises an actuating means for shifting the automatic transmission in accordance with a shift control signal, a basic sensor means for sensing at least a vehicle speed of the vehicle, and a basic controlling means for determining a desired speed of the automatic transmission corresponding to the vehicle speed according to a predetermined shift control mode, and producing the shift control signal to achieve the desired speed of the transmission.

The shift control system of the present invention further comprises an additional sensor means, a discriminating means, and a changing means. The additional sensor means comprises a first additional sensing means for sensing a steering amount of the vehicle and producing a first data signal, and a second additional sensing means for sensing a condition of a brake system of the vehicle and producing a second data signal. The discriminating means is a means for determining a degree of correlation between the first and second data signals. The changing means is a means for changing the shift control mode of the basic controlling means from a normal mode to a special mode and vice versa in dependence upon the degree of correlation.

FIG. 1 shows one example of a basic arrangement of the present invention. A shift control system of this example includes at least an actuating means 101, a basic sensor means 102, and a basic controlling means 103. The shift control system further includes at least an additional sensor means 104, a discriminating means 105 and a changing means 106. These means are connected with one another as shown by solid lines in FIG. 1.

In an illustrated embodiment of the present invention, the basic sensor means 102 comprises a vehicle speed sensor and a throttle opening sensor, and the additional sensor means 104 comprises a steering angle sensor, a brake sensor, and first and second accumulating means for sampling and accumulating values of output signals of the steering angle sensor and the brake sensor. The discriminating means 105 may comprise first and second storing means, a calculating means for calculating the degree of correlation, a deciding means for producing a discrimination signal, and first and second comparing means, as shown by broken lines in FIG. 1. In this example, the first data signal is a signal representing the steering amount of the vehicle, and the second data signal is a signal representing the frequency of brake applications, or the ratio of working time of the brake system to a predetermined total time.

DETAILED DESCRIPTION OF THE INVENTION

Figure 1:
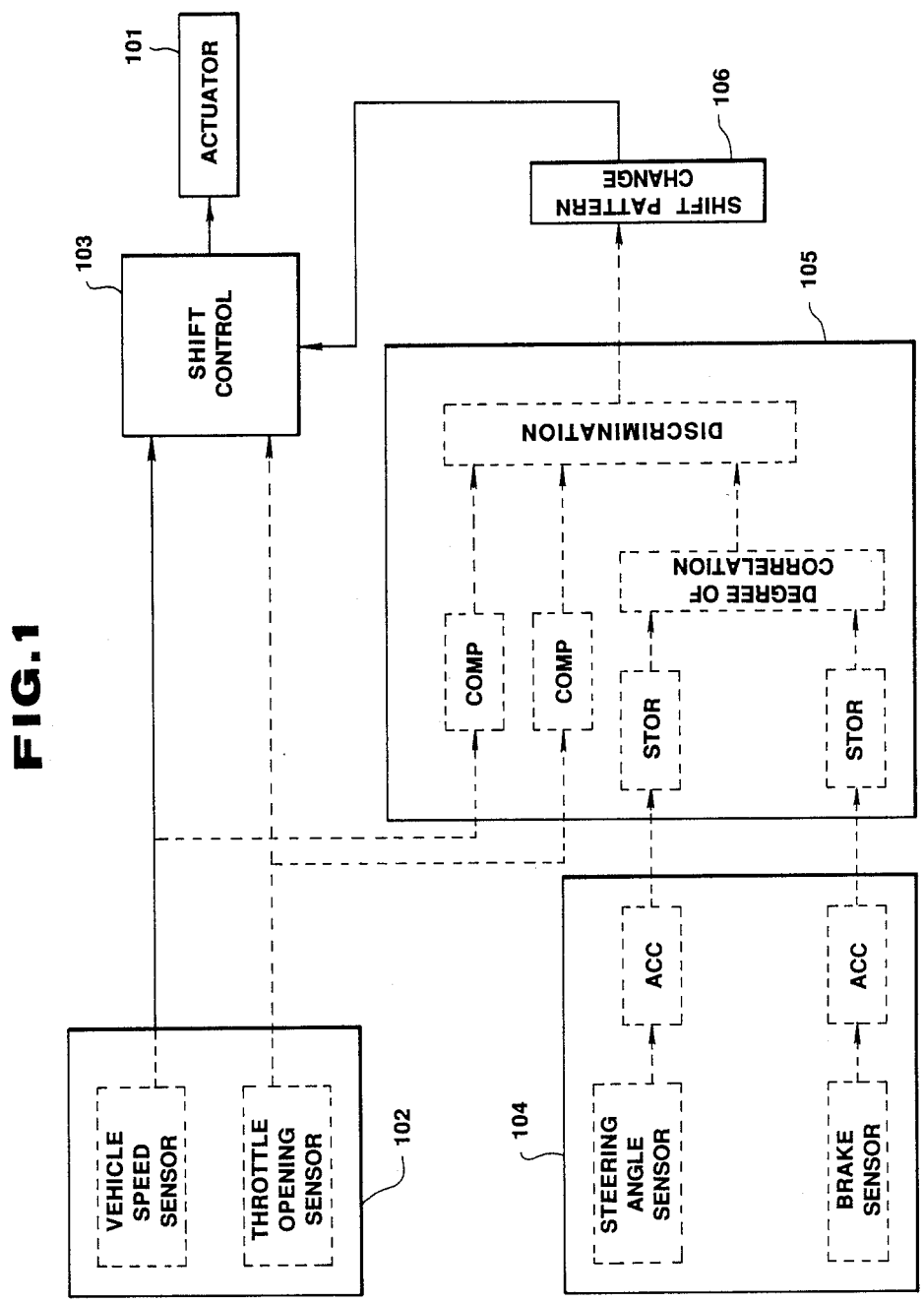
FIG. 1 a block diagram showing a basic arrangement the present invention.
Figure 2:
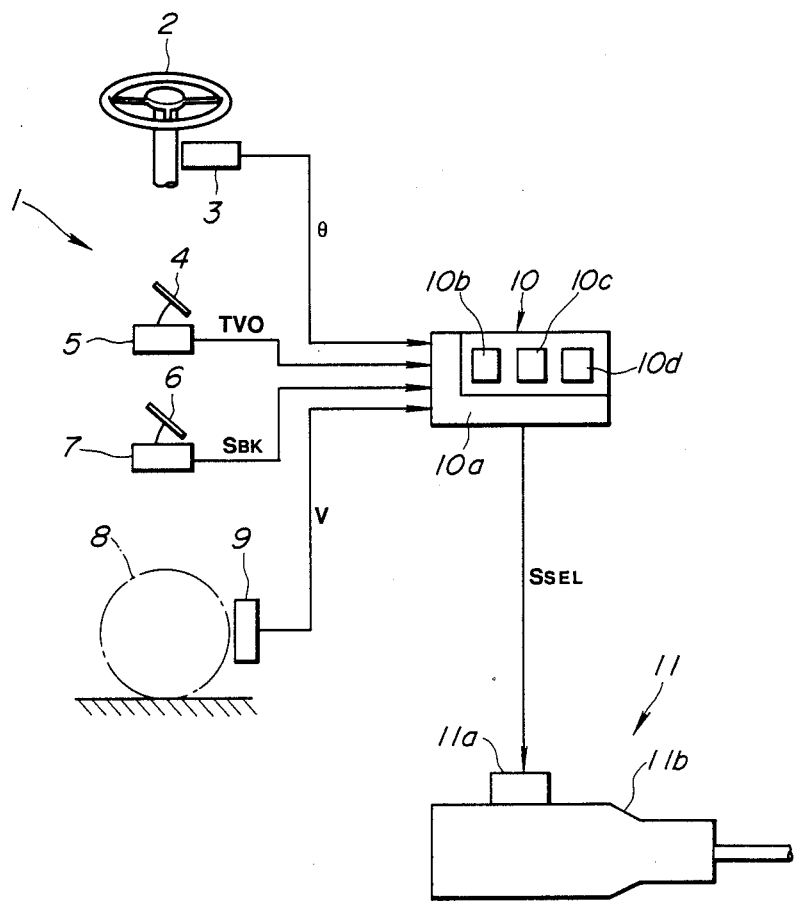
FIG. 2 a schematic view of an automatic transmission shift control system according to one embodiment of the present invention.

FIGS. 2–6 show one embodiment of the present invention.

A shift control system of this embodiment has a sensor group 1 including a steering amount sensor 3, an accelerator sensor 5, a brake sensor 7 and a vehicle speed sensor 9. The steering amount sensor 3 of this embodiment is a steering wheel angle sensor for sensing a steering angle $\theta$ of a steering wheel 2 of the vehicle. The accelerator sensor 5 of this embodiment is a throttle sensor for sensing a depression degree of an accelerator pedal of the vehicle or sensing an opening degree TVO of a throttle valve of the vehicle. The brake sensor 7 of this embodiment is a brake switch for sensing a position of a brake pedal 6 of the vehicle, and producing a brake operation signal $S_{BK}$ which is "0" when the brake pedal is not depressed at all, and which is "1" when the brake pedal is depressed in any degree. The vehicle speed sensor 9 of this embodiment is arranged to sense the vehicle speed V by sensing a revolution speed of one of road wheels 8 of the vehicle. Alternatively, the vehicle speed sensor may be arranged to sense a revolution speed of a meter cable within a speedometer, or to sense a revolution speed of an output shaft of an automatic transmission.

The shift control system further includes a control unit 10. The control unit 10 of this embodiment comprises a microcomputer including an I/0 buffer section 10a, a ROM section 10b, a RAM section 10c and a CPU 10d. The I/0 buffer section 10a is a section for receiving the steering angle 0, the throttle opening degree TVO, the brake operation signal $S_{BK}$, and the vehicle speed V, and outputting a shift control signal $S_{SEL}$. The ROM section 10b is a read only storage device for storing a shift control program, a primary shift pattern PT-P, and a secondary shift pattern PT-S. The RAM section 10c is a read/write storage device for storing arrays of data items. The CPU 10d is a control section for executing the shift control program by transferring data and other information to and from the I/0 buffer section 10a, the ROM section 10b and the RAM section 10c. The CPU 10d determines the shift position of the automatic transmission by using one of the shift patterns PT-P and PT-A, and produces the shift control signal $S_{SEL}$.

Figure 3:
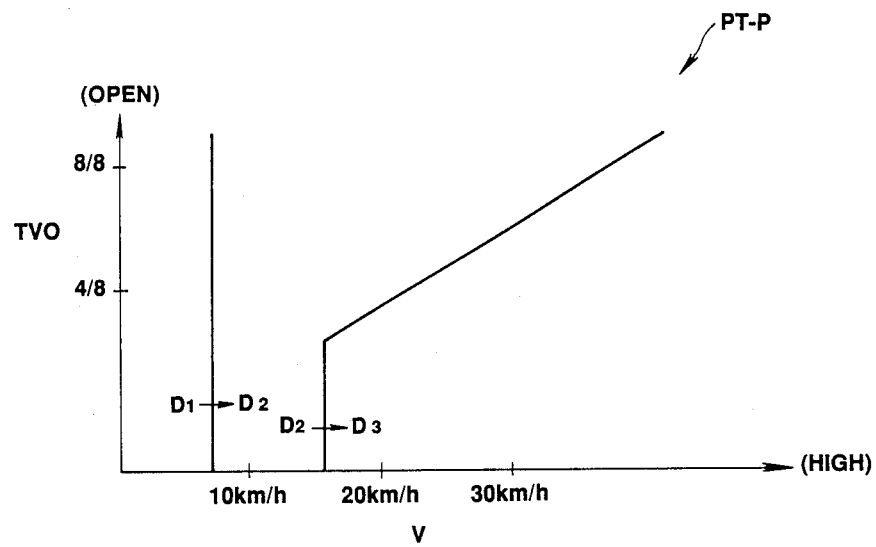
FIGS. 3 and 4 diagrams showing shift patterns used in the control system of FIG. 2.
Figure 4:
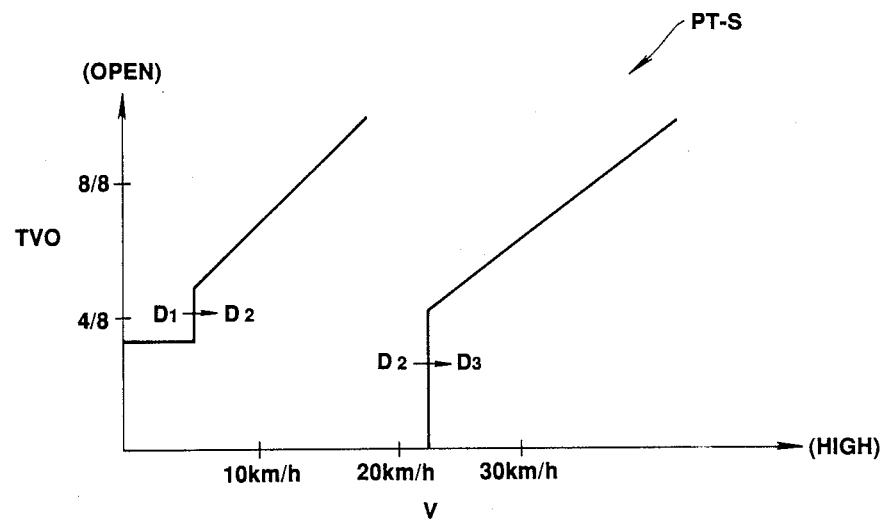

An automatic transmission 11 of this embodiment has a hydraulic circuit 11a and a transmission mechanism 11b having a planetary gear system. The hydraulic circuit 11a receives the shift control signal $S_{SEL}$ and controls the gear mechanism 11b in accordance with the shift control signal $S_{SEL}$ FIG. 3 shows the primary shift pattern PT-P of this embodiment which is stored in the ROM section 10b. (FIG. 3 shows only upshift lines, and lines for downshift are omitted.) The primary shift pattern PT-P is designed for normal vehicle operations. In this example, the shift schedule is determined by two parameters, the throttle opening TVO and the vehicle speed V. FIG. 4 shows the secondary shift pattern PT-S of this embodiment stored in the ROM section 10b. (In FIG. 4, lines for downshift are omitted.) The secondary shift pattern PT-S is a shift pattern specifically suited to narrow streets in residential areas, and other similar situations. The main difference between the main and secondary patterns resides in that the zone of the second speed ($D_2$) is widened especially in the region in which TVO is small, and V is low. Although this embodiment employs a three speed transmission, it is possible to employ a four speed automatic transmission.

Figure 5:
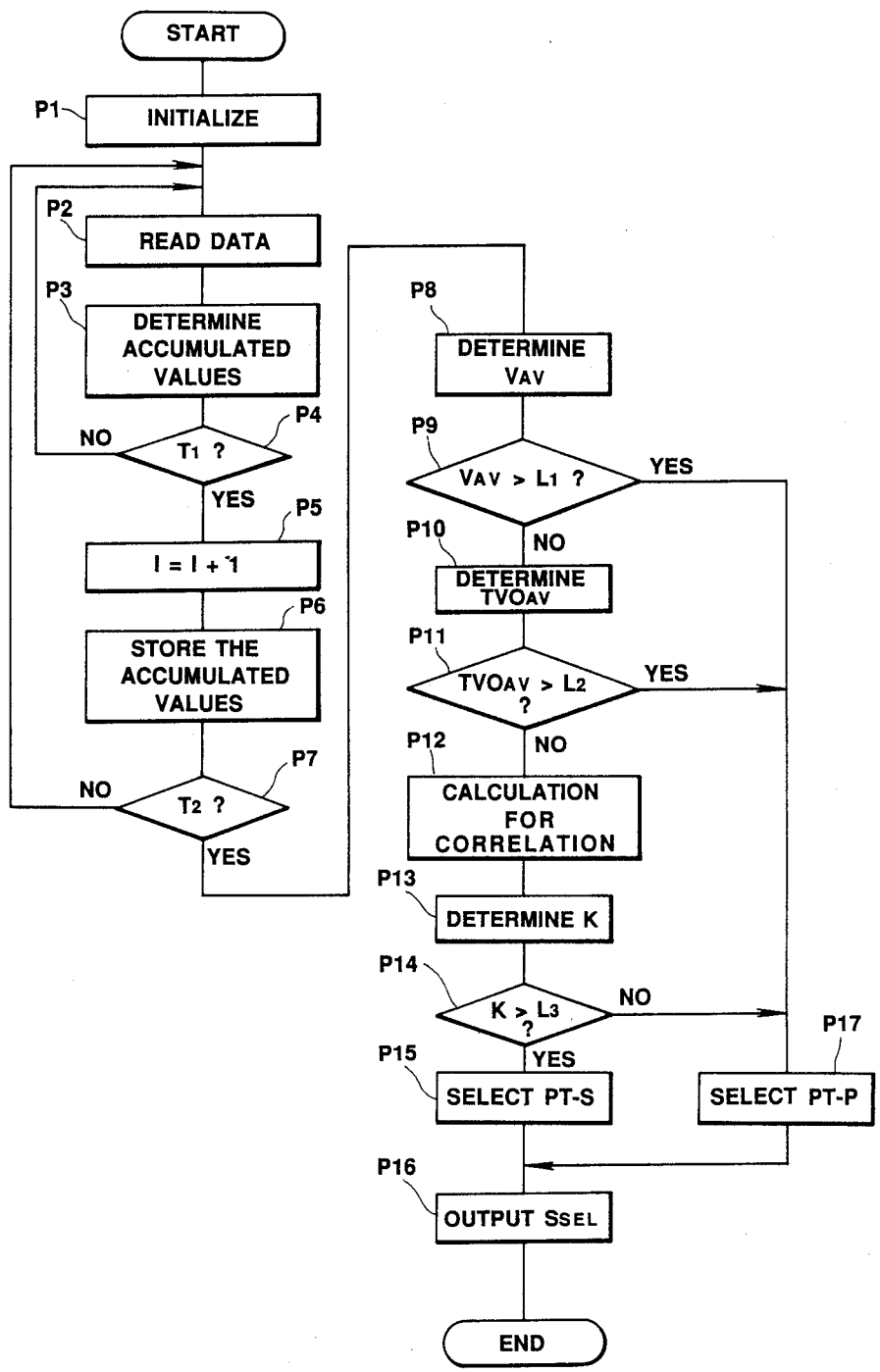
FIG. 5 is a flow chart showing a shift control process of the control system shown in FIG. 2.
Figure 6A:
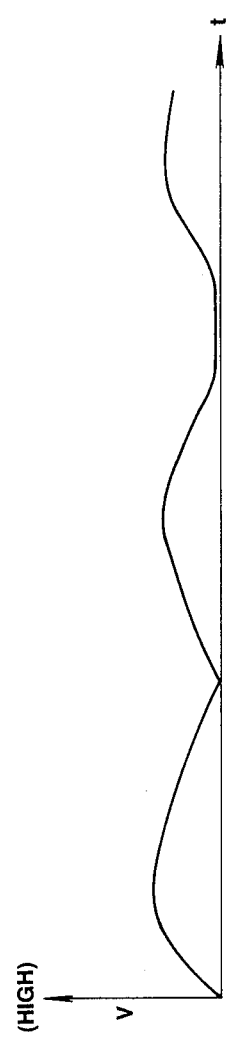
FIG. 6(a) –(c) are is a timing charts for showing effects of the shift control system of FIG. 2.
Figure 6B:
Figure 6C:
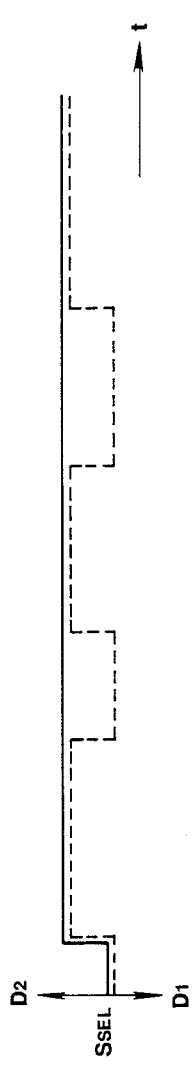

FIG. 5 shows the shift control program of this embodiment stored in the ROM section 10b.

When an ignition key of the vehicle is turned on, the control unit 10 is supplied with power, and a first request is made for timer interrupt, then the CPU 10d starts executing the shift control program.

At a first step P1, the CPU 10d initializes a predetermined field of the RAM section 10c used for storing data arrays. At a next step P2, the CPU 10d reads the various input data from the sensor group 1 such as $\theta$, TVO, $S_{BK}$ and V.

At a step P3, the CPU 10d determines accumulated quantities as follows:

An accumulated quantity AH of the steering angle $\theta$ is given by;

$$AH = AH_{-1} + D\theta \qquad (1)$$

where $AH_{-1}$ is a value of AH determined in the last repetition, $D\theta$ is an absolute value of a difference between $\theta$ and $\theta_{-1}$ ($D\theta = |\theta - \theta_{-1}|$), and $\theta_{-1}$ is a value of $\theta$ obtained in the last repetition.

An accumulated quantity $D_B$ of brake applications is given by an equation (2).

$$D_b = D_{B-1} + S_{BK} \qquad (2)$$

where $D_{B-1}$ is a value of $D_B$ determined in the last repetition.

An accumulated quantity ATVO of the throttle opening is given by an equation (3).

$$ATVO = ATVO_{-1} + TVO \qquad (3)$$

where $ATVO_{-1}$ is a value of ATVO determined in the last repetition.

An accumulated quantity U of the vehicle speed is given by an equation (4).

$$U = U_{-1} + V \qquad (4)$$

where $U_{-1}$ is a value of U determined in the last repetition.

At a step P4, the CPU 10d determines whether an elapsed time T reaches a predetermined time length $T_1$ (2 seconds, for example). The elapsed time T is measured by a timer which was initialized at the step $P_1$. If T is smaller than $T_1$, the CPU 10d returns to the step $P_2$. In this way, the CPU 10d repeats the steps $P_2$ and $P_3$ until the elapsed time T reaches the predetermined time length $T_1$. Consequently, the CPU 10d obtains instantaneous values of $\theta$, $S_{BK}$, TVO and V at regular intervals, and accumulates a predetermined number of the values for each of $\theta$, $S_{BK}$, TVO and V in the form of the accumulated quantity. This predetermined number is equal to $T_1/T_s$ where $T_s$ is a sampling period which is a period of repetitions of the reading step $P_2$.

At a step $P_5$, the CPU 10d increments (increases by one) an indicator I (which was initialized at the step $P_1$). The indicator I is used to distinguish elements of each data array.

At a step $P_6$, the CPU 10d stores the current value of each accumulated quantity at a position specified by the indicator I in the corresponding one of four data arrays, DA(STR,I), DA(B,I), DA(V,I) and DA(TVO,I). When I=1, for example, the CPU 10d stores the values of the accumulated quantities AH, $D_B$, ATVO and U in the first column positions of the arrays DA(STR,I), DA(B,I), DA(TVO,I) and DA(V,I), respectively. Then, the CPU 10d clears each accumulated quantity.

At a step $P_7$, the CPU 10d determines whether the elapsed time T reaches a predetermined time length $T_2$. The time length $T_2$ is set equal to $T_1 \times k$, where k is a number of elements of each array. For example, k=200, and each array includes a time series of 200 data items. Each array is in the form of a matrix having only one row and k columns (or a row vector). The CPU 10d repeats the steps $P_2$–$P_7$ until the elapsed time T reaches $T_2$. When T becomes equal to $T_2$, the CPU 10d has stored 200 values of each accumulated quantity in one array in sequence of time, and completed a data table of a matrix having four rows and k columns. Each element of the matrix is a value of one accumulated quantity which is a sum of a predetermined number ($T_1/T_S$) of sampled values of $\theta$, $S_{BK}$, TVO or V.

At a step $P_8$, the CPU 10d determines an average vehicle speed $V_{AV}$ which, in this embodiment, is defined as;

$$V_{AV} = \frac{\sum_{I=1}^{k} DA(V, I)}{k} \qquad (5)$$

At a step $P_9$, the CPU 10d compares the average vehicle speed $V_{AV}$ with a predetermined reference level $L_1$ corresponding to a predetermined low vehicle speed. The reference vehicle speed level $L_1$ is set equal to a value corresponding to a vehicle speed slightly higher than vehicle speeds normally achieved in narrow streets. If the average vehicle speed $V_{AV}$ is not higher than $L_1$, then the CPU 10d proceeds from the step $P_9$ to a step $P_{10}$. At the step $P_{10}$, the CPU 10d determines an average throttle opening degree $TVO_{AV}$ defined as;

$$TVO_{AV} = \frac{\sum_{I=1}^{k} DA(TVO, I)}{k} \qquad (6)$$

At a step $P_{11}$, the CPU 10d compares the average throttle opening degree $TVO_{AV}$ with a predetermined reference opening level $L_2$ corresponding to a predetermined small throttle opening degree. The reference opening level $L_2$ is set equal to a value corresponding to a throttle opening degree slightly higher than throttle opening values achieved in narrow streets.

If both answers of the steps $P_9$ and $P_{11}$ are negative, then the CPU 10d calculates quantities $K_1$ and $K_2$ by using the following equations (7) and (8) at a step $P_{12}$.

$$K_1 = \sum_{n=1}^{k} (X_{n1} - X_1')(X_{n2} - X_2') \quad (7)$$

$$k_2 = \sqrt{\sum_{n=1}^{k} (X_{n1} - X_1')^2} \sqrt{\sum_{n=1}^{k} (X_{n2} - X_2')^2} \quad (8)$$

In these equations, $X_1$ is an average of AH during $T_2$, and given by;

$$X_1' = \frac{\sum_{I=1}^{k} DA(STR, I)}{k} \quad (9)$$

The quantity $X_2'$ is an average of $D_B$ during $T_2$, and given by:

$$X_2' = \frac{\sum_{I=1}^{k} DA(B, I)}{k} \quad (10)$$

In the equations (7) and (8), the elements of the data array DA(STR,I) are represented b $X_{n1}$, and the elements of the data array DA(B,I) are represented by $X_{n2}$, where n corresponds to I(I=1,2,3,...K), and n is any whole number from 1 to k.

At a step $P_{13}$, the CPU 10d calculates a correlation coefficient K between steering operation and braking operation according to the following equation (11).

$$k = \frac{K_1}{K_2} \quad (11)$$

The thus-obtained correlation coefficient K becomes high when the steering and braking operations are both frequent, and exhibits a peculiar tendency when the vehicle is running along a narrow street requiring frequent steering and brake operations. Furthermore, the control system of this embodiment is arranged to perform the calculation of the correlation coefficient K only when the vehicle speed V is in a low speed range determined by the step $P_9$, and at the same time, the throttle opening degree is in a low opening range determined by the step $P_{11}$.

The following table shows values of the correlation coefficient K obtained in various driving conditions.

TABLE 1

| | CLASSIFICATION | K |
|---|---|---|
| I | Expressway | 0.01 or below |
| II | Ordinary Road (National Road) | 0.03 |
| III | Relatively Gentle Mountain Road | 0.1 |
| IV | Urban District | 0.2 |
| V | Residential Area | 0.6 |
| VI | Very Narrow Crooked Road | 0.7 |

As known from the table 1, the frequencies of steering operations and brake applications become higher, and the correlation coefficient K becomes higher in the order of I, II, III ... VI.

Therefore, the shift control system of the invention is arranged to distinguish driving conditions by monitoring the correlation coefficient. At a step $P_{14}$, the CPU 10d compares the current value of the correlation coefficient with a predetermined reference coefficient value $L_3$. In this embodiment, the reference coefficient value $L_3$ is set equal to an appropriate value between the value of K obtained in the driving situation IV of the table 1, and the value of K obtained in the driving situation V.

If the correlation coefficient K is higher than the reference value $L_3$, then the CPU 10d selects the secondary shift pattern PT-S at a step P15, and determines the desired shift position of the automatic transmission by using the shift pattern PT-S at a step P16. In the secondary pattern PT-S, the zone of the second speed ($D_2$) is broadened as shown in FIG. 4, and the tendency to select the second speed is increased. At the step $P_{16}$, the CPU 10d delivers the shift control signal $S_{SEL}$ to achieve the determined speed, to the automatic transmission 11.

Therefore, in the driving situations (V) and (VI), this control system can prevent unwanted upshifts and downshifts by holding the transmission gear mechanism 11b at the second speed, and improve the drive feeling, and the controllability of the vehicle.

On the other hand, the CPU 10d selects the normal shift pattern PT-P at a step $P_{17}$ when is higher than $L_1$ (i.e., the answer of the step $P_9$ is affirmative), when TVOAV is higher than $L_2$ (i.e., the answer of the step $P_{11}$ is affirmative) and when K is equal to or smaller than $L_3$ (i.e., the answer of the step $P_{14}$ is negative).

In this way, the control system of this embodiment is arranged to increase the tendency that a predetermined lower speed is selected, when the frequencies of the steering operations and brake applications are both high. Therefore, this control system holds the second speed as shown by a solid line in a graph (c) of FIG. 6, by preventing undesired upshifts and downshifts as in a broken line characteristic of a conventional shift control system.

The control system of this embodiment employs the secondary shift pattern in addition to the normal shift pattern. However, it is possible to prevent undesired shifts by modifying TVO and V so as to change the shift schedule of PT-P without using another shift pattern.

What is claimed is:

1. A shift control system for an automatic transmission of a vehicle, comprising:
   actuating means for shifting said automatic transmission in accordance with a shift control signal;
   basic sensor means for sensing a vehicle speed of said vehicle;
   basic controlling means for determning a desired shift position of said automatic transmission corresponding to said vehicle speed in accordance with a predetermined shift control mode, and producing said shift control signal to achieve said desired shift position;
   additional sensor means comprising first additional sensing means for sensing a steering amount of said vehicle and producing a first data signal, and second additional sensing means for sensing a condition of a brake system of said vehicle and producing a second data signal;
   discriminating means for determining a degree of correlation between said first and second data signals;

wherein said discriminating means comprises first storing means for storing a plurailty of values of said first data signal obtained at time intervals, second storing means for storing a plurality of values of said second data signal obtained at time intervals, calculating means for determining said degree of correlation which is a correlation coefficient between said values stored in said first storing means and said values stored in said second storing means, deciding means for comparing said correlation coefficient with a predetermined coefficient value, and for producing a discrimination signal when said correlation coefficient is higher than said predetermined coefficient value, and first comparing means for comparing said vehicle speed with a predetermined speed level, and wherein said discriminating means produces said discrimination signal when said correlation coefficient is higher than said predetermined coefficient values and at teh same time saie vehicle speed is lower than said predetermined speed level; and changing means for changing said shirt control mode of said basic controlling means when said discrimination signal is present.

2. A shift control system according to claim 1, wherein said basic sensor means comprises vehicle speed sensing means for sensing said vehicle speed, and accelerator se nsing means for sensing an accelerator opening degree by sensing a position of a movable element of an accelerating system of said vehicle, and wherein said discriminating means further comprises second comparing means for comparing said accelerator opening degree with a predetermined opening level, said discriminating means producing said discrimination signal only when said accelerator opening degree is smaller than said predetermined opening level.

3. A shift control system according to claim 2, wherein said first additional sensing means comprises a steering angle sensor for sensing a steering angle signal which represents said first data signal and wherein said second additional sensing means comprises a brake sensor for sensing a position of a brake pedal of said vehicle and for producing a brake signal which represents said second data signal and which is in a first signal state when signal state when said brake pedal is depressed.

4. A shift control system according to claim 3, wherein said first additional sensing means further comprises first accumulating means for sampling values of said steering angle signal at regular intervals of a predetermined sampling period, and for determining values of an accumulated quantity which is a sum of a predetermined first number of successively sampled values of said steering angle signal, at regular intervals of a predetermined first time length, and wherein said second additional sensing means further comprises second accumulating means for sampling values of said brake signal at regular time intervals of said sampling period, and for determining, at regular intervals of said first time length, values of an accumulated quantity which is a sum of said predetermined first number of successively sampled values of said brake signal.

5. A shift control system according to claim 4, wherein said first storing means stores a predetermined second number of values of said accumulated quantity of said steering angle signal, and said second storing means stores said predetermined second number of values of said accumulated quantity of said brake signal.

* * * * *